April 21, 1942.   B. G. CARLSON   2,280,116
AUTOMATIC MEANS FOR CAGING GYROSCOPES
Filed March 3, 1939   3 Sheets-Sheet 1
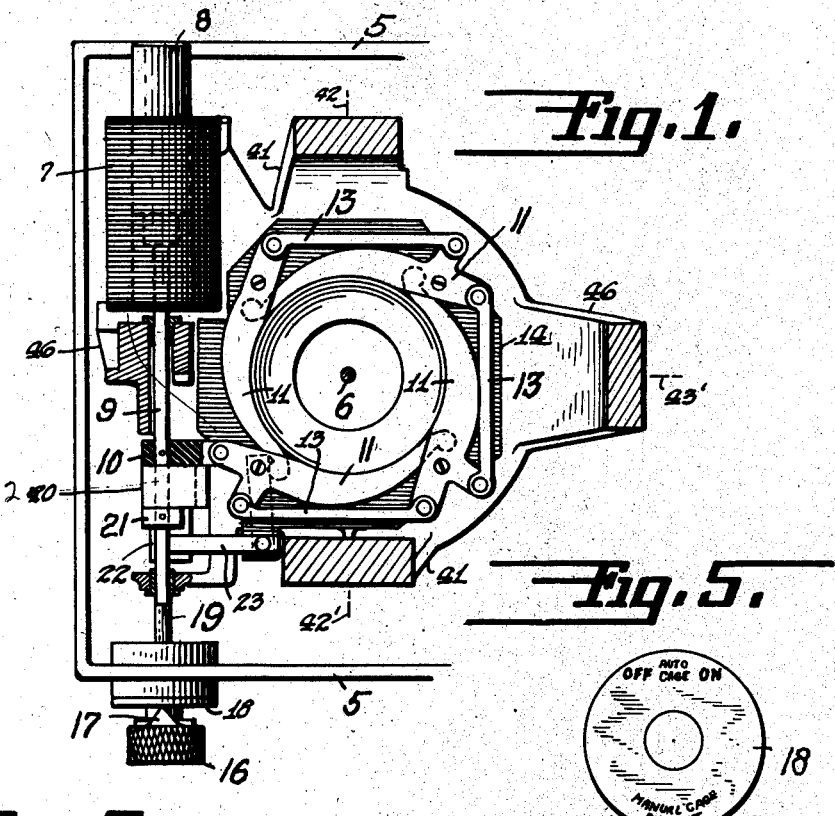
Fig.1.
Fig.5.
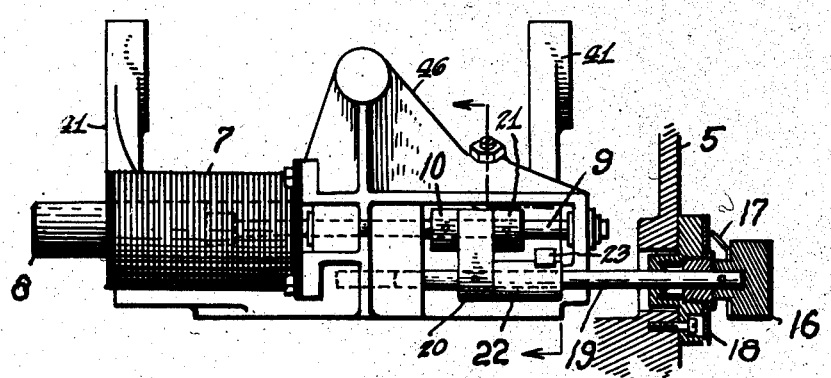
Fig.2.
INVENTOR
Bert G. Carlson
HIS ATTORNEY April 21, 1942.                B. G. CARLSON                  2,280,116
                    AUTOMATIC MEANS FOR CAGING GYROSCOPES
                      Filed March 3, 1939            3 Sheets-Sheet 2

INVENTOR
Bert G. Carlson
HIS ATTORNEY

April 21, 1942.    B. G. CARLSON    2,280,116
AUTOMATIC MEANS FOR CAGING GYROSCOPES
Filed March 3, 1939    3 Sheets-Sheet 3
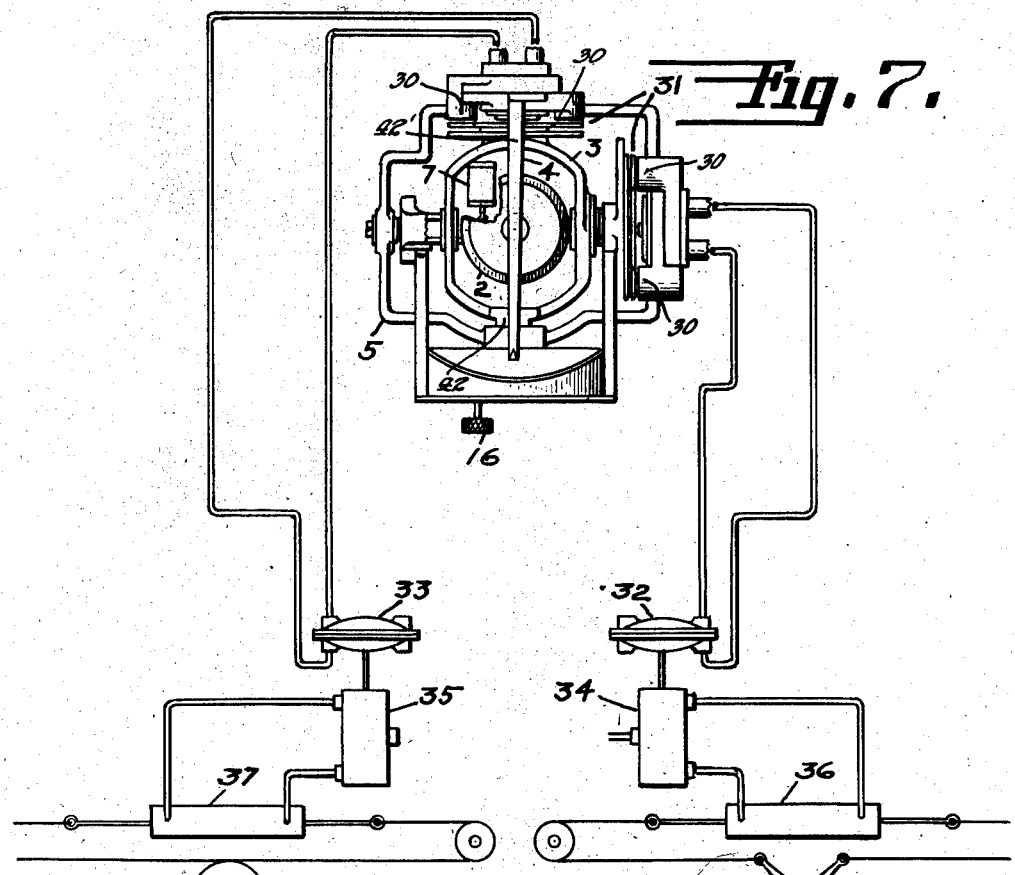
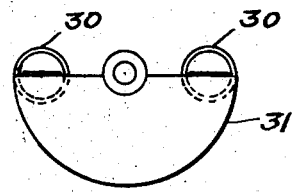
INVENTOR
Bert G. Carlson
BY
HIS ATTORNEY Patented Apr. 21, 1942

2,280,116

UNITED STATES PATENT OFFICE 2,280,116

AUTOMATIC MEANS FOR CAGING GYROSCOPES

Bert G. Carlson, Freeport, N. Y., assignor to Sperry Gyroscope Company, Inc., Brooklyn, N. Y., a corporation of New York Application March 3, 1939, Serial No. 259,590

5 Claims. (Cl. 244—79)

This invention relates to gyroscopes mounted in gimbal bearings for freedom about two mutually perpendicular axes of support and it refers more specifically to automatic means for caging such gyroscopes or preventing rotation about their support axes under predetermined conditions. One important application of my invention is in connection with automatic pilots for aircraft in which gyroscopic controls are used to maintain an airplane in level flight and on a fixed course in azimuth or to cause it to climb and/or bank at predetermined angles. Under ordinary flight conditions the operation of the airplane may be safely entrusted to the automatic pilot but under certain abnormal conditions it may become necessary to suspend the action of the gyroscopic controls and effect a quick change in operating procedure.

It is a well known fact that when an airplane is operated at too slow a speed or at too great an angle of attack, there is the possibility that a sudden change of attitude due to a gust of air may cause it to stall and go into a spin. This element of danger is especially pronounced in the operation of fast military pursuit ships having relatively high stalling speeds. When stalled, an airplane no longer responds to the movement of its control surfaces in the normal manner and it has been found that the proper procedure under these circumstances is immediately to bring the ailerons and elevator to their central positions and hold them there until sufficient air speed has been attained to insure control by the usual method. As at present designed, no automatic pilot will achieve this result, but on the contrary the pilot will place the control surfaces in an extreme position.

My invention is shown as applied to an automatic pilot of the general type shown in prior Patent No. 1,992,970, dated March 5, 1935, E. A. Sperry, Jr., M. F. Bates, and applicant, inventors. The function of maintaining the airplane in level flight or at a predetermined rate of climb and/or angle of bank is governed by a gyroscope rotating about a vertical axis and mounted for freedom about two horizontal axes of support. The spinning axis is maintained vertical by any of well known erection means, such as shown in the aforesaid patent and in my prior Patent 1,982,636, dated December 4, 1934, for Air driven gyro verticals. Such a gyroscope constitutes an artificial horizon and provides a stabilized reference plane from which angles of bank and climb are measured. This instrument, known as the 'bank and climb gyro', 'gyro-vertical' or 'artificial horizon', has two air pick-offs acting through suitable servo systems to move the control surfaces in a manner which, under normal flight conditions, returns the ship to the attitude for which the automatic pilot is set when it departs from that attitude. Since the "bank and climb gyro" does not distinguish between normal and abnormal flight conditions, when a change of attitude occurs which is sufficient to stall the ship and thereby make necessary a changed method of control, the gyroscope, by moving the control surfaces in the usual manner, not only aggravates the condition, but makes it impossible to bring the ship out of the resulting spin.

One object of my invention is to provide quick-acting automatic means for caging the "bank and climb gyro" thereby centralizing the control surfaces when for any reason the plane departs from the attitude at which it is flying by more than an adjustable, predetermined angle. When flying speed has been recovered after a stall, the gyro may be uncaged, and as it precesses back to the vertical, it will level out the airplane. This of course may be speeded up by operating the bank and/or climb knobs of the automatic pilot, as is done without automatic caging. In addition to the function above described my invention also provides a safety feature to prevent upsetting the airplane if the gyro precesses hard over through failure of some part to function.

The automatic caging means provided by my invention may be engaged or disengaged at will and does not interfere with the conventional manual caging of the gyroscope.

Other objects and advantages of this invention will become apparent as the description proceeds.

Although my invention has been described in its application to automatic pilots for airplanes, it will be obvious that it is not restricted to such application but may be used for the automatic caging of any airplane gyroscope having normal freedom about a plurality of axes.

Referring to the drawings showing one form of my invention:

Fig. 1 is a plan view, partly in section, showing my invention mounted on a housing for a gyroscope.

Fig. 2 is a partial elevation showing the caging solenoid and means for changing from automatic to manual caging.

Fig. 5 is a detail of the caging knob escutcheon plate.

Fig. 7 is a schematic diagram showing my invention associated with two controls of an automatic pilot as, for example, the elevator and aileron controls.

Fig. 8 is a detail of one of the air pick-offs from a control gyroscope of an automatic pilot.

Figure 3:
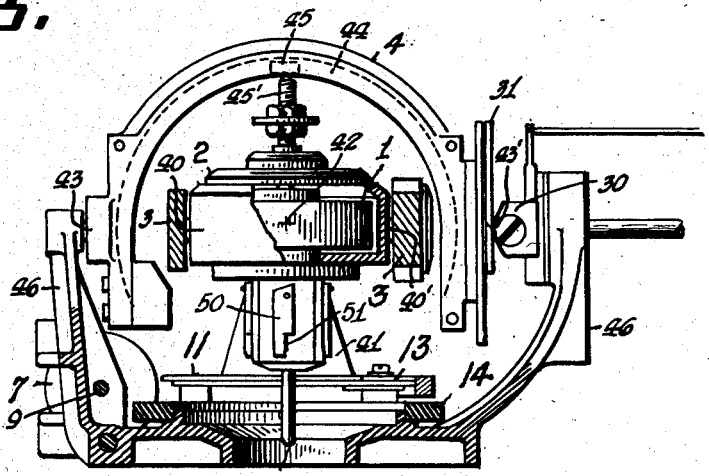
Fig. 3 is an elevation showing the gyroscope mounted in a well known type of gimbal support and a part of the caging mechanism.
Figure 4:
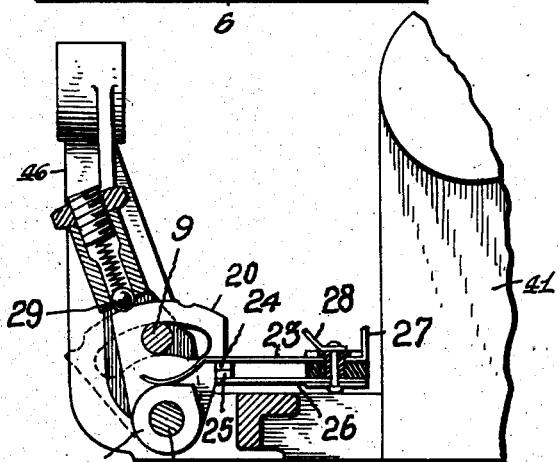
Fig. 4 is a detail of the cam switch for interrupting the solenoid circuit.

My invention is shown in connection with a gyroscope spinning about a vertical axis and mounted in a support allowing rotational freedom about two horizontal axes. 1 is the rotor of the gyroscope which is preferably airspun although obviously other means for spinning the rotor may be adopted, and 2 is the casing or rotor bearing frame in which the rotor bearings are mounted. Said casing is shown as pivoted on a minor axis 40—40' within gimbal ring 3, which in turn is pivoted on major axis 42—42' in fixed brackets 41. The gyroscope is normally maintain vertical by gravitationally responsive means shown as a plurality of small pendulums 50 pivoted on a downward extension of the gyro case and cooperating with air ports 51 therein, as shown more in detail in the aforesaid patents. For picking off the relative motion of the gyroscope about its minor axis, I have shown a bail 4 pivoted on axis 43—43' normally in line with axis 40—40', a sliding connection being provided between the bail and the gyroscope by means of the usual channel 44 in the bail and a roller 45 on a pin 45' projecting from the casing 2. A portion of the housing for the instrument is shown at 5, which supports the brackets 41 for the gimbal ring and 46 for the bail.

For centralizing the gyroscope, I have shown projecting from the lower part of the gyro case a pin 6. The caging mechanism proper is automatically controlled by a solenoid 7 having a plunger 8 and a thrust rod 9 guided in suitable bearings with a collar 10 of insulating material mounted thereon. Collar 10 is pivotally connected to one of a plurality of fingers 11 pivotally connected by a plurality of links 13 and pivotally mounted on a ring 14 of insulating material in such a manner that the movement of solenoid plunger 8 from its non-operated to its operated position within the winding simultaneously rotates all of fingers 11 about their pivots, causing the several fingers to close inwardly engaging pin 6 at any position it may occupy and move said pin to a central position with respect to the housing. The rotor is thus caged and secured against rotation about the gimbal axes. Since ring 14 on which caging fingers 11 are pivoted and collar 10 on the solenoid thrust rod are both made of insulating material, the caging fingers have no electrical connection to the housing in their normal non-operated condition.

Means for caging the gyroscope manually and for disconnecting the automatic caging circuit is provided by caging knob 16 bearing an index 17 readable upon markings on escutcheon plate 18 and attached to caging knob shaft 19 at one extremity. A sector 20 mounted on shaft 19 having an arcuate slot through which shaft 9 passes, permits translational motion to be transmitted from shaft 19 to rod 9 by engaging collars 10 and 21 while allowing independent rotation of shaft 19 limited by said slot. Thus, by pulling knob 16 outwardly away from the housing, caging fingers 11 are operated in the same manner as when the solenoid is energized.

A cam 22 of insulating material carried by shaft 19 engages a leaf spring 23 insulated from the housing, having a contact 24 cooperating with contact 25 on a second spring 26, said second spring being grounded or electrically connected to the housing. Connecting lugs 27 and 28 provide means for making an electrical connection to switch springs 23 and 26 respectively. In the position shown with knob 16 turned to the right, contacts 24 and 25 form an electrical connection. When, however, knob 16 is rotated to the left, cam 22 raises spring 23 and breaks this connection. There are four possible positions which knob 16 may occupy: (a) in and rotated to the right (b) in and rotated to the left (c) out and rotated to the right (d) out and rotated to the left. A detent including a spring loaded ball 29 and four suitably located depressions on the periphery of sector 20 holds the caging mechanism in any of the four positions to which it is operated.

Figure 6:
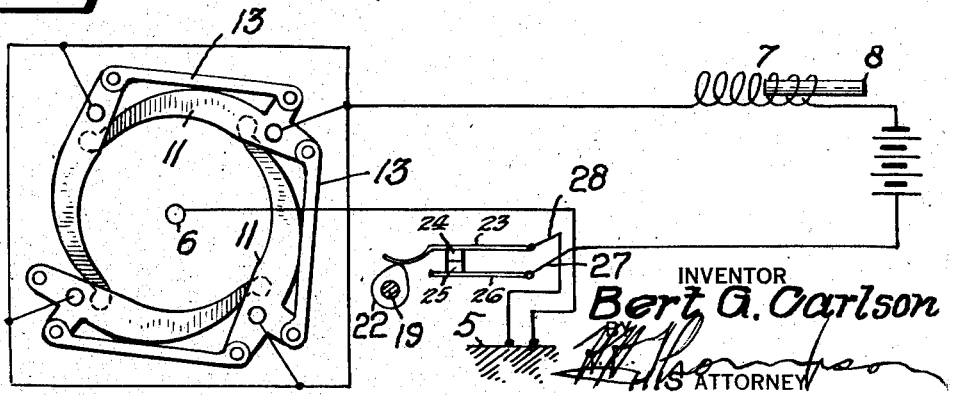
Fig. 6 is a schematic diagram of the electrical circuit.

Referring to Fig. 6 and assuming caging knob 16 to be in and rotated to the right, the circuit in which the winding of solenoid 7 is serially connected may be traced as follows: starting at the housing, to lug 28, spring 23, contact 24, contact 25, spring 26, lug 27 to one pole of a battery of suitable voltage or other source of E. M. F.; through the battery to the opposite pole, through the winding of solenoid 7 to caging fingers 11. This circuit is completed when any of caging fingers 11 engages pin 6, said pin being electrically connected to the housing through the gimbal bearings. The arc through which the housing 5 must swing from its normal position to bring any of caging fingers 11 in contact with pin 6 is adjusted by positioning collars 21 and 10 on shaft 9.

The association of my invention with the 'bank and climb' gyro of an automatic pilot and the manner in which it positions the control surfaces controlled therefrom may be seen by reference to Fig. 7. The air pick-offs on the two support axes of the gyroscope, one controlling the angle of bank and the other the angle of climb and their methods of operation are described in the above mentioned patent to E. A. Sperry, Jr., M. F. Bates and applicant and will not be discussed in detail here. The type of pick-off referred to is illustrated in Fig. 8 which shows two air ports 30 through which air is continuously drawn and whose opening and closing is differentially controlled by shutter 31. The pick-offs through air relays 32 and 33 and balanced oil valves 34 and 35 control the operation of servo motors 36 and 37 which position ailerons 38 and elevator 39 respectively. The caging of the 'bank and climb' gyro by the operation of solenoid 7 centralizes the two shutters 31 and equalizes the openings of their associated air ports, thereby causing servo motor 36 and 37 through the means described to bring ailerons 38 and elevator 39 to a central position and hold them in such position.

The operation of my invention in its application to automatic pilots is briefly as follows: When flying at speeds at which there is little possibility of stalling even if a relatively large change of attitude of the ship occurs, caging knob 16 will be in and rotated to the left with index 17 at the position "Auto cage off." This breaks the connection between contacts 24 and 25 and prevents solenoid 7 from becoming energized. At slower speeds when a sudden change of attitude might stall the ship and throw it into a spin, knob 16 is rotated to the right to the position "Auto cage on." This establishes a connection between contacts 24 and 25 so that if the ship now changes attitude by more than a predetermined angle which may be, for example, of the order of 10 to 40 degrees longitudinally, laterally, or in an intermediate direction, one of caging fingers 11 will be brought in contact with pin 6, thereby completing the circuit through the winding of solenoid 7 energizing said solenoid and causing the plunger to move from its non-operated to its operated position within the winding. This movement of the plunger, through the intermediary of thrust rod 9 and collar 10 causes caging fingers 11 to move inwardly and bring pin 6 to a central position and hold it there. This centralizing of the spinning axis of the 'bank and climb gyro' with respect to the housing of the instrument causes the associated elevator and aileron servo-operated controls to bring these surfaces to their central positions and permits the reestablishment of longitudinal and lateral control of the airplane. At any time thereafter at the discretion of the human pilot, the "bank and climb gyro" may be uncaged by turning knob 16 to the left to the position "Auto cage off." This breaks the solenoid circuit at contacts 24 and 25 and deenergizes the solenoid after which the plunger may be returned to its non-operated position by pushing knob 16 in toward the housing thereby retracting caging fingers 11. After uncaging, should it be desired to reestablish the condition for automatic caging, knob 16 is returned to the position "Auto cage on.".

The gyro may be caged manually at any time by pulling out knob 16 regardless of the position to which this knob is rotated. Preferably, however, the knob will be rotated to the left so that solenoid 7 will not be energized when caging fingers 11 engage pin 6.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. The combination with a gyro-vertical having a rotor and rotor bearing frame and an outer support mounting said frame for freedom about two mutually perpendicular axes, of a gravitationally responsive means for normally maintaining the gyroscope vertical, an automatically operated cage for centralizing said frame with respect to the support, and a controller for said cage brought into action by a predetermined relative tilt of said frame and said support.

2. The combination with the vertical gyroscope of an automatic pilot having a rotor and rotor bearing frame mounted for normal freedom about two mutually perpendicular gimbal axes and gravity controlled erection means for maintaining the spin axis of said rotor vertical, of electromagnetically operated means, means attached to said rotor bearing frame and cooperative stationary means for controlling said electromagnetic means and a cage operated by said electromagnetic means for positioning said rotor bearing frame and securing it against rotation about said gimbal axes, thereby rendering the bank and climb control of the automatic pilot inoperative.

3. Gyro-vertical apparatus for automatic control of the flight of an aircraft, comprising a housing fixed relative to the craft, a gyroscope mounted on said housing for three degrees of freedom, gravity controlled means for normally maintaining the spin axis of said gyroscope vertical, means including movable control surfaces of the craft actuated by relative motion between said gyroscope and housing for maintaining the craft in a desired attitude relative to the horizontal, and caging means to immobilize said gyroscope relative to said housing upon predetermined departure of the craft from said attitude, said control surfaces being thereby moved to and held in a preferred position.

4. Means for automatically rendering the bank and climb control of an automatic pilot inoperative under abnormal flight conditions, comprising cooperative contact means mounted respectively on the rotor bearing frame of the vertical gyroscope of said control and on the craft for engagement upon predetermined departure of the craft from a set attitude relative to the horizontal in any direction, and means actuated upon engagement of said two contacts to cage said gyroscope in fixed relationship to the axes of said craft, thereby causing said pilot to move a control surface or surfaces determining the attitude of said craft to a preferred position and there hold said surface or surfaces immobilized.

5. Automatic caging means for a gyroscope having a housing, a rotor and a rotor bearing frame mounted on said housing for freedom about two perpendicular support axes, comprising a contact member mounted on and extending from said frame along the spin axis of said rotor, a plurality of caging members movably supported on said housing and normally spaced from said contact member, said caging members each having an electrically conducting portion, means for simultaneously operating said caging members to cause engagement with said contact member and thereby cause positioning of said frame in a preferred position, said frame being finally immobilized by said caging members in said position, and circuit means controlled by engagement of said contact member and the conducting portion of any of said caging members for actuating said last named means.

BERT G. CARLSON.